(12) United States Patent
Kawakami et al.

(10) Patent No.: US 11,449,289 B2
(45) Date of Patent: Sep. 20, 2022

(54) PRINT CONTROL SERVER, PRINT CONTROL SYSTEM, AND PRINT CONTROL METHOD

(71) Applicant: SEIKO EPSON CORPORATION, Tokyo (JP)

(72) Inventors: Yosuke Kawakami, Matsumoto (JP); Ryosuke Kakio, Matsumoto (JP); Takashi Sera, Shiojiri (JP); Yuma Kitahara, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/447,079

(22) Filed: Sep. 8, 2021

(65) Prior Publication Data
US 2022/0075578 A1    Mar. 10, 2022

(30) Foreign Application Priority Data
Sep. 8, 2020    (JP) .............................. JP2020-150358

(51) Int. Cl.
*G06F 3/12*    (2006.01)
(52) U.S. Cl.
CPC .......... *G06F 3/1238* (2013.01); *G06F 3/1205* (2013.01); *G06F 3/1286* (2013.01)

(58) Field of Classification Search
CPC combination set(s) only.
See application file for complete search history.

(56) References Cited

U.S. PATENT DOCUMENTS

| | | | |
|---|---|---|---|
| 2018/0032297 A1* | 2/2018 | She | G06F 3/1238 |
| 2020/0133592 A1 | 4/2020 | Mitsuhashi et al. | |
| 2022/0075578 A1* | 3/2022 | Kawakami | G06F 3/1286 |
| 2022/0075580 A1* | 3/2022 | Kawakami | G06F 3/1203 |

FOREIGN PATENT DOCUMENTS

JP    2020-071598 A    5/2020

* cited by examiner

*Primary Examiner* — Helen Zong
(74) *Attorney, Agent, or Firm* — Workman Nydegger

(57) ABSTRACT

A print control server that controls printing through an SNS includes a registration section configured to register, in association with each other, a first account that is an account of a user of a first SNS and print setting information including designation information of a printer to be used for printing. The registration section accepts a designation of the first account and a designation of a second account that is an account of a user of a second SNS and that is to be a share destination of a print setting, and registers the print setting information associated with the first account also in association with the second account.

7 Claims, 4 Drawing Sheets

PRINT CONTROL SERVER, PRINT CONTROL SYSTEM, AND PRINT CONTROL METHOD

The present application is based on, and claims priority from JP Application Serial Number 2020-150358, filed Sep. 8, 2020, the disclosure of which is hereby incorporated by reference herein in its entirety.

BACKGROUND

1. Technical Field

The present disclosure relates to a print control server, a print control system, and a print control method.

2. Related Art

A user who uses social networking services (hereinafter referred to as "SNSs") may post files of text, photographs, and the like on the SNS so as to publish the posts to users capable of viewing the posts. Furthermore, such a user may use a print system communicating with an SNS through a network to print a file posted on the SNS by a printer registered in advance in the print system.

Furthermore, the following information processing apparatus is disclosed (refer to JP-A-2020-71598). That is, the information processing apparatus posts, when a user who has a printer that has not been registered posts a print instruction on a chat room, a message requesting a registration of the printer on the chat room, registers, when the user posts a printer ID on the chat room in response to the post, the printer ID in association with the user, and executes printing by the registered printer.

However, the user may have different accounts for different SNSs and often use the plurality of SNSs. In this case, when the user desires to use the printer in use of the SNSs, a setting process for registering the printer in each SNS account or the like is required to be repeatedly performed which is a high burden.

SUMMARY

According to an aspect of the present disclosure, a print control server that controls printing through an SNS includes a registration section configured to register, in association with each other, a first account that is an account of a user of a first SNS and print setting information including designation information of a printer to be used for printing. The registration section accepts a designation of the first account and a designation of a second account that is an account of a user of a second SNS and that is to be a share destination of a print setting, and registers the print setting information associated with the first account also in association with the second account.

According to another aspect of the present disclosure, a print control system includes a registration server configured to register, in association with each other, a first account that is an account of a user of a first social networking service (SNS) and print setting information including designation information of a printer to be used for printing, a first SNS print server configured to cause, in accordance with a post of a print instruction from the first account on the first SNS, a printer designated by the print setting information associated with the first account in the registration server to execute printing, and a second SNS print server configured to cause, in accordance with a post of a print instruction from a second account that is an account of a user of a second SNS on the second SNS, a printer designated by print setting information associated with the second account to execute printing. The registration server accepts a designation of the first account and a designation of the second account that is to be a share destination of a print setting, and registers the print setting information associated with the first account also in association with the second account.

According to a further aspect of the present disclosure, a print control method for controlling printing through a social networking service (SNS) includes a registering step of registering, in association with each other, a first account that is an account of a user of a first SNS and print setting information including designation information of a printer to be used for printing. The registering step accepts a designation of the first account and a designation of a second account that is an account of a user of a second SNS and that is to be a share destination of a print setting, and registers the print setting information associated with the first account also in association with the second account.

DESCRIPTION OF EXEMPLARY EMBODIMENTS

Hereinafter, an embodiment of the present disclosure will be described with reference to the accompanying drawings. Note that each figure is merely an example for illustrating the embodiment. Since each figure is an example, proportions and shapes of components may not be accurate, the same components may not be consistent with each other, or some parts may be omitted.

1. System Configuration

Figure 1:
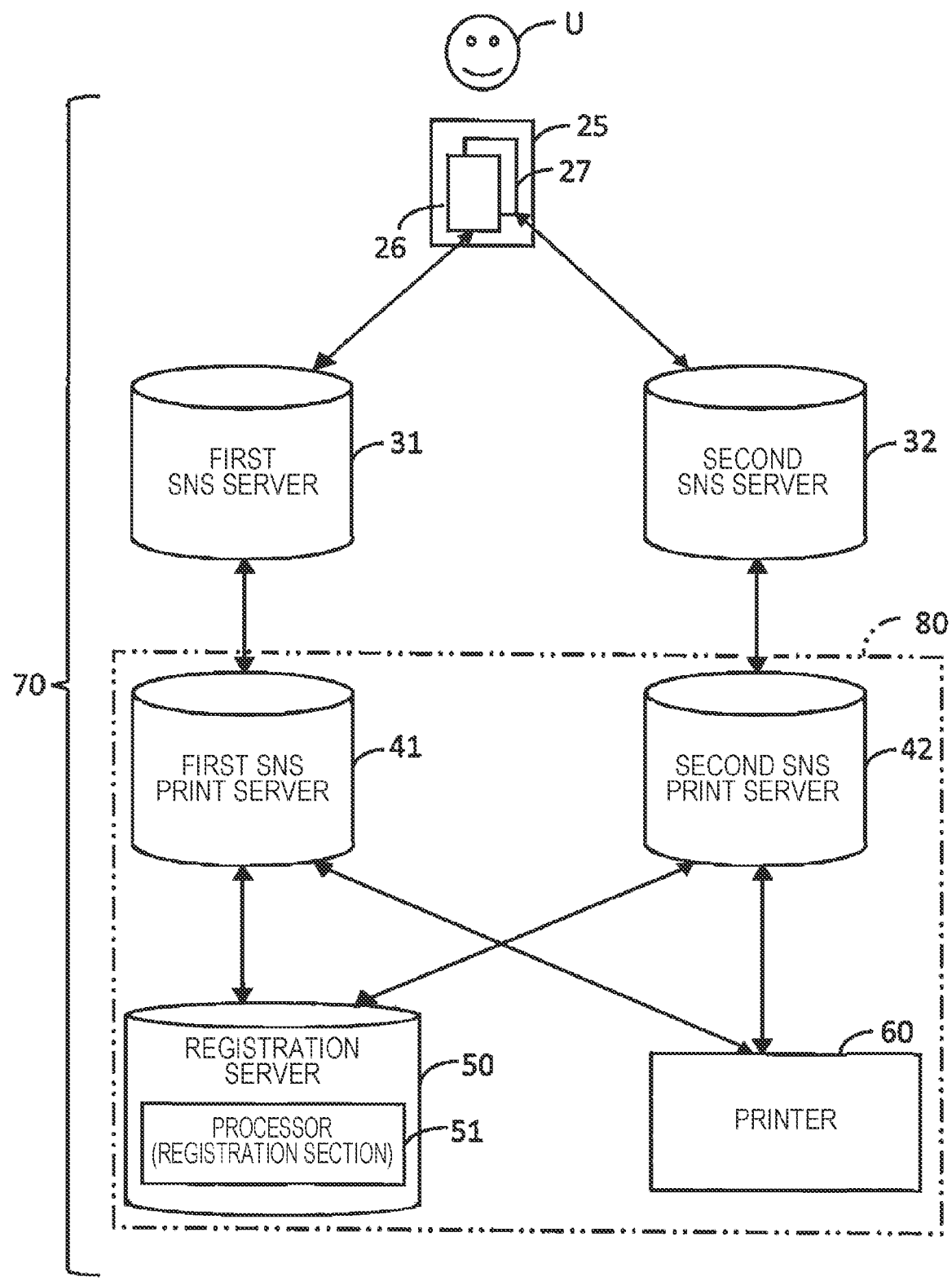
FIG. 1 is a block diagram schematically illustrating a system.

FIG. 1 is a block diagram schematically illustrating a configuration of a system 70 according to this embodiment. At least a portion of the system 70 corresponds to a print control system 80. According to FIG. 1, the system 70 includes a terminal device 25, a plurality of servers 31, 32, 41, 42, and 50, and a printer 60. The terminal device 25, the servers 31, 32, 41, 42, and 50, and the printer 60 are connected to one another through the Internet in a communication available manner.

Figure 2:
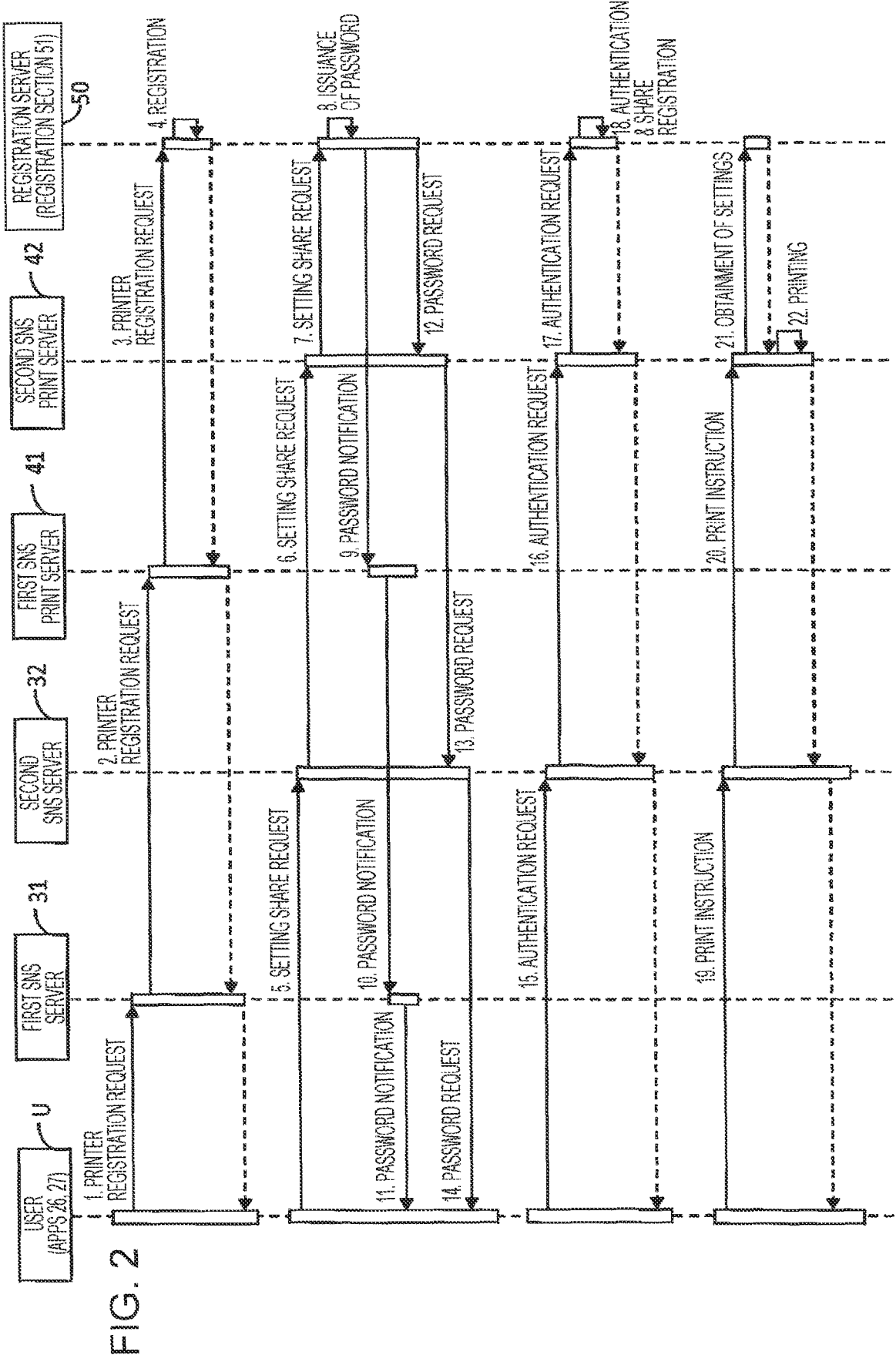
FIG. 2 is a sequence diagram illustrating a process according to an embodiment.

The terminal device 25 is a communication apparatus operated by a user U, such as a smartphone, a tablet terminal, or a personal computer (PC). A plurality of applications are installed in the terminal device 25. In the example of FIG. 1, the examples of the applications installed in the terminal device 25 include a first SNS application 26 for using a "first SNS" and a second SNS application 27 for using a "second SNS". The first SNS and the second SNS are different SNSs. In FIG. 2, the term "application" is abbreviated as "app".

Specifically, the user U is a user of the first SNS and also a user of the second SNS. An account of the user of the first SNS is referred to as a "first account" and an account of the user of the second SNS is referred to as a "second account". The user U has the first account and the second account in advance. The term "account" indicates information for identifying a user in an SNS and includes a user ID, a password, and other personal information. The term "account" may be rephrased as "user information". The user U may use various SNSs in addition to the first SNS and the second SNS.

The user U uses the first SNS by logging in the first SNS application 26 activated in the terminal device 25 by using the first account. The user U uses the second SNS by logging in the second SNS application 27 activated in the terminal device 25 by using the second account. The user U may indicate a single user or a plurality of users having the close relationship, such as family members or co-workers.

The first SNS server 31 indicates a single or a plurality of servers that provide the first SNS on the Internet. The first SNS server 31 and the first SNS application 26 cooperate with each other so that the first SNS is provided for the user U having the first account. The second SNS server 32 indicates a single or a plurality of servers that provide the second SNS on the Internet. The second SNS server 32 and the second SNS application 27 cooperate with each other so that the second SNS is provided for the user U having the second account.

The first SNS print server 41 indicates a single server or a plurality of servers that cause the printer 60 associated with the first account to execute printing in accordance with a post of a print instruction issued from the first account to the first SNS. The first SNS application 26 communicates with the first SNS print server 41 through an application programming interface (API) provided by the first SNS server 31 so as to transmit and receive information required for printing.

The second SNS print server 42 indicates a single server or a plurality of servers that cause the printer 60 associated with the second account to execute printing in accordance with a post of a print instruction issued from the second account to the second SNS. The second SNS application 27 communicates with the second SNS print server 42 through an API provided by the second SNS server 32 so as to transmit and receive information required for printing.

Only the single printer 60 is illustrated in FIG. 1. However, the first SNS print server 41 and the second SNS print server 42 may individually use a plurality of printers through the Internet.

The registration server 50 indicates a single server or a plurality of servers that individually communicate with the first SNS print server 41 and the second SNS print server 42. A registration section 51 serving as a function of a processor controlling the registration server 50 registers, in association with each other, the first account and print setting information including designation information of the printer 60 to be used by the first account in the registration server 50. Furthermore, the registration section 51 registers, in association with each other, the second account and print setting information including designation information of the printer 60 to be used by the second account in the registration server 50.

In this embodiment, a load of the setting to be performed by the user U is reduced by efficiently performing the registration of the printer 60 required to be executed for individual SNS accounts. In the example of FIG. 1, the print control system 80 includes the registration server 50, the first SNS print server 41, and the second SNS print server 42. The print control system 80 realizes a print control method. Furthermore, some of or all the servers included in the print control system 80 correspond to a "print control server" controlling printing through an SNS. The print control system 80 may include the printer 60.

2. Printer Share Registration Process

FIG. 2 is a sequence diagram illustrating processes executed by the components included in the system 70. In FIG. 2, a process indicated by reference numerals 5 to 18 particularly corresponds to a "printer share registration process". The user U of FIG. 2 means a user U specified by the first account for using the first SNS through the first SNS application 26 or a user U specified by the second account for using the second SNS through the second SNS application 27 depending on a scene in the description.

For convenience of description, the user U specified by the first account who uses the first SNS through the first SNS application 26 by operating the terminal device 25 is referred to as a "first user U", and the user U specified by the second account who uses the second SNS through the second SNS application 27 by operating the terminal device 25 is referred to as a "second user U". As is apparent from the description above, the first user U and the second user U may be the same person or different persons having the close relationship. The terminal device 25 operated by the first user U and the terminal device 25 operated by the second user U may be the same device or different devices.

In FIG. 2, the first user U performs "1. Printer Registration Request" to register the printer 60 to be used in the first SNS by the first account. In this case, print setting information including designation information of the printer 60 to be used by the first account is transmitted as the printer registration request from the first SNS application 26 to the first SNS server 31. The print setting information is input by the first user U. The designation information of the printer 60 indicates information on a serial number, an ID, a mail address, an address on the network of the printer 60, for example, to be used to specify the printer 60 serving as a communication counterpart. The print setting information includes, in addition to the designation information of the printer 60, settings of various items required for printing, such as a sheet size and a color/monochrome setting.

As is apparent from "2. Printer Registration Request" and "3. Printer Registration Request", the printer registration request received by the first SNS server 31 is transmitted from the first SNS server 31 to the first SNS print server 41 and further transmitted from the first SNS print server 41 to the registration server 50. The first SNS print server 41 transmits the printer registration request to the registration server 50 along with information on the first account that is a source of the printer registration request.

The registration section 51 of the registration server 50 performs "4. Registration" in response to the printer registration request received from the first SNS print server 41. In this case, the registration section 51 performs registration by associating the first account serving as the source of the printer registration request with the print setting information included in the printer registration request and storing the first account and the print setting information in the storage region included in the registration server 50. Although briefly illustrated in FIG. 2 by an arrow mark of a dotted line, the registration section 51 may transmit information indicating that the registration is completed in response to the printer registration request to the first account that is the source of the printer registration request through the first SNS print server 41 and the first SNS server 31.

Subsequently, the second user U performs "5. Setting Share Request" in a state in which the registration of the printer 60 to be used in the first SNS by the first account is completed and registration of the printer 60 to be used in the second SNS by the second account is not completed. In this case, a setting share request that designates the first account to share the print setting information with the second account, that is, the "first account of a share source" is transmitted from the second SNS application 27 to the second SNS server 32. The first account of the share source is information input by the second user U, and therefore, naturally, a registration of the printer 60 of the first account is completed as described above.

As is apparent from "6. Setting Share Request" and "7. Setting Share Request", the setting share request received by the second SNS server 32 is transmitted from the second SNS server 32 to the second SNS print server 42 and further transmitted from the second SNS print server 42 to the registration server 50. The second SNS print server 42 transmits the setting share request to the registration server 50 along with information on the second account that is a source of the setting share request.

The reception of the setting share request of the registration section 51 of the registration server 50 means a reception of a designation of the first account of the share source and a reception of a designation of the second account (hereinafter referred to as a "second account of a share destination") to be a share destination of a print setting associated with the first account of the share source. The registration section 51 performs "8. Issuance of Password" in response to the setting share request received from the second SNS print server 42. A password issued here is referred to as a "first password" for convenience sake.

The registration section 51 that has issued the first password performs "9. Password Notification" for notifying the first account of the share source designated by the setting share request of the first password. As is apparent from "9. Password Notification", "10. Password Notification", and "11. Password Notification", the first password issued by the registration section 51 is transmitted from the registration server 50 to the first SNS print server 41 and further from the first SNS print server 41 to the first SNS server 31 so as to be transmitted to the first account, that is, the first user U. In this way, the first password issued by the registration section 51 is transmitted to the first account through the first SNS.

The registration section 51 that has issued the first password transmits "12. Password Request" for prompting input of a password to a source of the setting share request, that is, the second account of the share destination. As is apparent from "12. Password Request", "13. Password Request", and "14. Password Request", the password request is transmitted from the registration server 50 to the second SNS print server 42 and further from the second SNS print server 42 to the second SNS server 32 so as to be transmitted to the second account, that is, the second user U.

Figure 3:
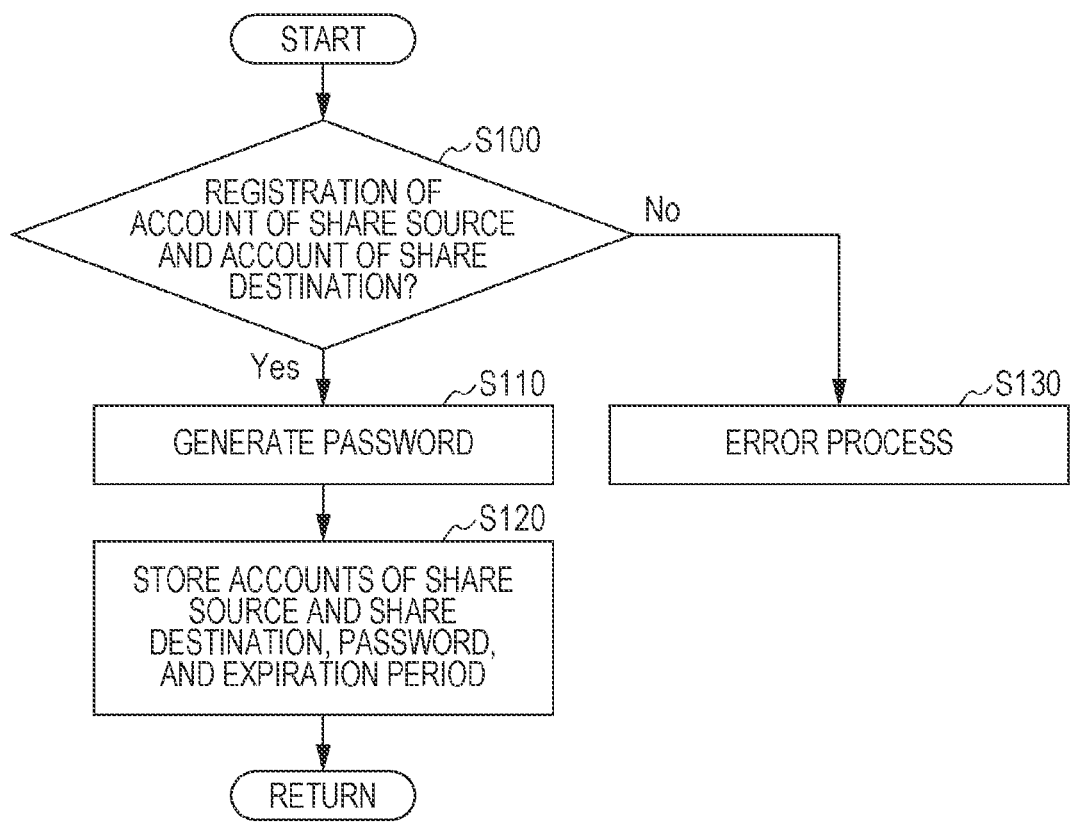
FIG. 3 is a flowchart illustrating in detail issuance of password.

FIG. 3 is a flowchart illustrating in detail "8. Issuance of Password" of FIG. 2. The registration section 51 starts the flowchart of FIG. 3 in response to a reception of the setting share request from the second SNS print server 42.

In step S100, the registration section 51 determines whether both the first account of the share source and the second account of the share destination have been registered in the registration server 50. The term "registration" in step S100 simply means a registration of an account in the registration server 50 irrespective of registration of the printer 60.

Valid first accounts of the first SNS managed by the first SNS server 31 are transmitted to the registration server 50 through the first SNS print server 41 and registered also in the registration server 50. Similarly, valid second accounts of the second SNS managed by the second SNS server 32 are transmitted to the registration server 50 through the second SNS print server 42 and registered also in the registration server 50. Accordingly, in step S100, the registration section 51 makes an affirmative determination only when the first account of the share source coincides with one of the first accounts registered in the registration server 50 and the second account of the share destination coincides with one of the second accounts registered in the registration server 50, and the process proceeds to step S110. On the other hand, the registration section 51 makes a negative determination when the first account of the share source does not coincide with any of the first accounts registered in the registration server 50 or the second account of the share destination does not coincide with any of the second accounts registered in the registration server 50, and the process proceeds to step S130.

In step S130, the registration section 51 terminates the sequence of FIG. 2 after performing an error process. When the process proceeds to step S130, the registration section 51 does not execute any of "9. Password Notification" and "12. Password Request" in FIG. 2. In the error process, the registration section 51 transmits information indicating that the setting share request may not be accepted, that is, an error, as a message to the second account of the share destination, for example.

In step S110, the registration section 51 generates a password. The password generated in step S110 is a first password. Any method may be employed for generating a password.

In step S120, the registration section 51 stores, in association with one another, the first account of the share source, the second account of the share destination, the first password generated in step S110, and an expiration period of the first password in the registration server 50, and terminates the flowchart of FIG. 3. The registration section 51 may set the expiration period of the first password to approximately several minutes, for example. Such a first password having an expiration period is one of one-time passwords.

Returning to FIG. 2, the description is continued.

The second user U who has received "14. Password Request" through the second SNS performs "15. Authentication Request". Specifically, the second user U performs an authentication request by posting the first password recognized by the first user U through the first SNS in response to "11. Password Notification" on the second SNS by the second account of the second user U. Here, it is assumed that the first user U and the second user U are the same person or different persons having the close relationship, and therefore, the second user U may obtain the first password transmitted to the first user U through the first SNS and perform posting on the second SNS.

As is apparent from "16. Authentication Request" and "17. Authentication Request", the authentication request including the password and posted on the second SNS is transmitted from the second SNS server 32 to the second SNS print server 42 and further from the second SNS print server 42 to the registration server 50. The second SNS print server 42 transmits the authentication request to the registration server 50 along with the information on the second account that is the source of the authentication request.

The registration section 51 performs "18. Authentication and Share Registration" in response to the authentication request received from the second SNS print server 42.

Figure 4:
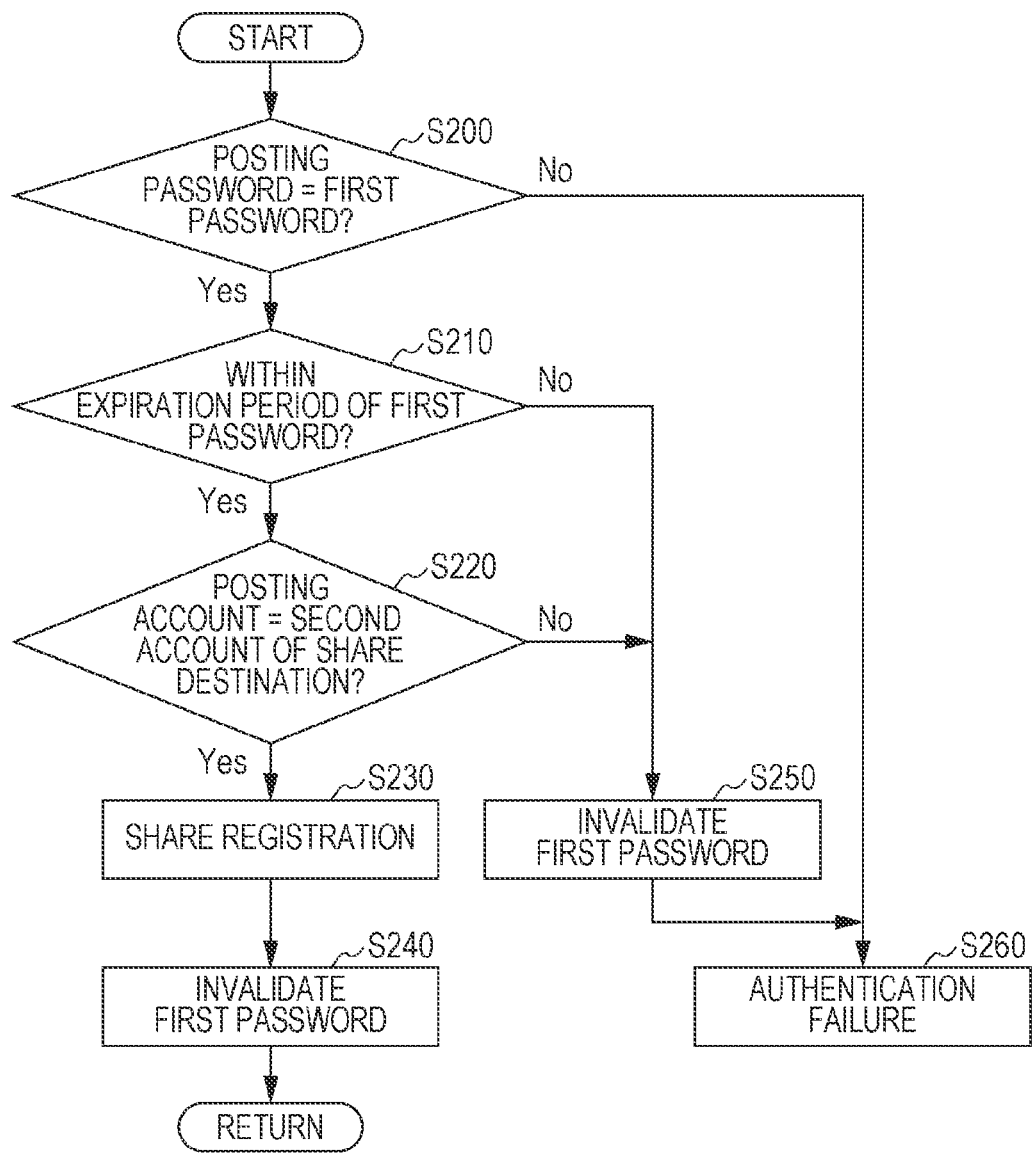
FIG. 4 is a flowchart illustrating in detail authentication and share registration.

FIG. 4 is a flowchart illustrating in detail "18. Authentication and Share Registration" of FIG. 2. The registration section 51 starts the flowchart of FIG. 4 in response to a reception of the authentication request from the second SNS print server 42. In the description made with reference to FIG. 4, the password included in the authentication information is referred to as a "posting password", and the second account that is the source of the authentication request is referred to as a "posting account".

In step S200, the registration section 51 determines whether one of first passwords stored in the registration server 50 coincides with the posting password. The registration section 51 makes an affirmative determination when the posting password coincides with one of the first passwords stored in the registration server 50 and proceeds to step S210, and makes a negative determination when the posting password does not coincide with any of the first passwords stored in the registration server 50 and proceeds to step S260. The first password stored in the registration server 50 corresponds to the first password that was stored in the past in step S120 and that is currently stored. Apparently, when the registration server 50 does not store any one of the first passwords in step S200, the determination is negative in step S200.

In step S210, the registration section 51 determines whether the expiration period of the first password determined to coincide with the posting password in step S200 is currently not expired. The registration section 51 makes an affirmative determination when the expiration period has not elapsed and proceeds to step S220, and on the other hand, makes a negative determination when the expiration period has elapsed and proceeds to step S250. When the determination is negative in step S210, the registration section 51 does not perform the determination in step S220 and determines that the posting password posted on the second SNS by the posting account does not coincide with the first password issued when the setting share request is received from the second account.

In step S220, the registration section 51 determines whether the posting account coincides with the second account of a share destination stored in a state in which the second account is associated with the first password determined to coincide with the posting password in step S200. The registration section 51 makes an affirmative determination when the posting account coincides with the second account of the share destination stored in the state in which the second account is associated with the first password determined to coincide with the posting password in step S200 and proceeds to step S230, and otherwise, makes a negative determination and proceeds to step S250.

In the process in step S220 described above, the registration section 51 determines whether the second user U who has issued the setting share request is the same person as the second user U who has issued the authentication request. When the determination is affirmative in step S220, the registration section 51 determines that authentication of the user U has been successfully performed since it may be determined that the posting password posted on the second SNS by the second account coincides with the first password issued when the setting share request is received from the second account.

In step S230, the registration section 51 associates the print setting information registered after being associated with the first account of the share source stored in a state in which the first account is associated with the first password determined to coincide with the posting password in step S200 also with the second account of the share destination stored in a state in which the second account is associated with the first password determined to coincide with the posting password in step S200 and registers the print setting information in the registration server 50. Specifically, share registration of the print setting information is performed. By this, the same print setting information is associated with the first account of the first user U and the second account of the second user U.

In step S240 following step S230, the registration section 51 invalidates the first password determined to coincide with the posting password in step S200, and thereafter, the flowchart of FIG. 4 is terminated. The invalidation of the first password means removal of the first password from the registration server 50.

The registration section 51 invalidates, in step S250, the first password determined to coincide with the posting password in step S200 when the determination is negative in step S210 or step S220, and proceeds to step S260. The process in step S250 is the same as that in step S240. In step S260, the registration section 51 determines that the authentication of the user U has failed and terminates the sequence of FIG. 2. That is, the registration section 51 invalidates the first password in which it is determined whether the posting password posted on the second SNS by the second account coincides with the first password issued when the setting share request is received from the second account, irrespective of success or failure of the authentication performed through step S210 and step S220 so that the first password may not be used after that.

Although briefly illustrated by an arrow mark of a dotted line in FIG. 2, the registration section 51 may transmit information indicating that the share registration of the print setting information with the first account is completed in response to the authentication request to the second account that is the source of the authentication request through the second SNS print server 42 and the second SNS server 32.

Note that, when determining that the authentication has failed in step S260 of FIG. 4, the registration section 51 may transmit a message indicating that the authentication has failed or a message indicating that the share registration with the first account may not be performed to the second account that is the source of the authentication request.

After the share registration of the print setting information with the first account is completed, the second user U may post a print instruction ("19. Print Instruction" in FIG. 2) associated with a file on the second SNS by the second account. The print instruction posted on the second SNS by the second account is transmitted to the second SNS print server 42 from the second SNS server 32 as indicated by "20. Print Instruction". The second SNS print server 42 obtains the print setting information registered in a state in which the print setting information is associated with the second account of the transmission source of the print instruction from the registration server 50 in response to the print instruction ("21. Obtainment of Settings"), and executes "22. Printing" in accordance with the obtained print setting information. Specifically, the second SNS print server 42 causes the printer 60 designated by the obtained print setting information to execute printing of a file indicated by the print instruction in accordance with settings designated by the print setting information.

Although not illustrated in FIG. 2, apparently, the first user U posts the print instruction associated with a file on the first SNS by the first account so as to cause the first SNS print server 41, through the first SNS server 31, to execute printing by the printer 60 in accordance with the print setting information registered in the registration server 50 in a state in which the print setting information is associated with the first account.

3. Conclusion

As described above, the print control server includes the registration section 51 that registers, in association with each other, the first account that is an account of the user of the first SNS and the print setting information including the designation information of the printer 60 to be used for printing. The registration section 51 accepts a designation of the first account and a designation of the second account that is an account of the user of the second SNS and that is to be the share destination of the print setting, and registers the print setting information associated with the first account also in association with the second account.

With this configuration, the user U may designate the first account and the second account that is to be the share destination of the print setting in a state in which the first account and the print setting information are registered in association with each other in the print control server so as to register the print setting information registered in association with the first account also in association with the second account in the print control server. In this way, a burden of the user U in which a setting process, such as input of the print setting information in different SNSs to use the printer 60 in the different SNSs, is repeatedly performed in the general technique may be reduced. Furthermore, when the user U desires to share the printer 60 and the print setting to be used in the first SNS and the second SNS and when the same print setting information is input in the first SNS and the second SNS as performed in the general techniques, it is highly likely that the sharing fails due to an input error. However, according to this embodiment, such a risk may be reduced. Specifically, the printer 60 may be easily shared by the different SNSs.

Furthermore, according to this embodiment, the registration section 51 issues a first password when accepting the designation of the first account and the designation of the second account, notifies the first account of the first password through the first SNS, and registers, when the password posted on the second SNS by the second account coincides with the first password, the print setting information associated with the first account also in association with the second account.

With this configuration, the share registration of the print setting information associated with the first account may be performed for the user U having the first account of the share source or the user U having the close relationship with the user U having the first account of the share source. Accordingly, a risk of leakage of the print setting information to a third party which does not relate to the user U having the first account of the share source and a risk of the share registration performed by the third party may be reduced.

Furthermore, according to this embodiment, after determining whether the password posted on the second SNS by the second account coincides with the first password, the registration section 51 may invalidate the first password.

With this configuration, security of the sharing of the print setting information may be improved by invalidating the first password used once in the authentication irrespective of success or failure of the authentication of the user U using the first password.

Furthermore, according to this embodiment, the registration section 51 may set an expiration period of the first password, and, when the password is posted on the second SNS by the second account, in a case in which the expiration period of the first password elapsed, the registration section 51 may determine that the password posted on the second SNS by the second account does not coincide with the first password.

With this configuration, the security of the sharing of the print setting information may be improved by setting the expiration period of the first password.

Note that this embodiment is not limited to a mode in which the print setting information is shared by the first account and the second account on authentication of the user U using the first password.

For example, the registration section 51 may register, when receiving "7. Setting Share Request" of FIG. 2, the print setting information registered in association with the first account of the share source in association with the second account of the share destination without executing "8. Issuance of Password", "9. Password Notification", and "12. Password Request". Moreover, the registration section 51 may register the print setting information registered in association with the first account of the share source in association with the second account of the share destination when receiving "7. Setting Share Request" and making an affirmative determination in step S100 of FIG. 3.

The registration section 51 may obtain the password posted by the second account by using a chat function provided by the second SNS.

The user U may perform any posting and view posts of other users by using the chat function provided by the SNS so as to communicate with the other users. Therefore, the user U may also post the password by the second account by using the chat function provided by the second SNS. Specifically, the posting by the second user U and the various notifications from the registration section 51 to the second user U, that are illustrated in FIG. 2, may be performed one to one, for example, using the chat function provided by the second SNS. With this configuration, the second user U may communicate with the registration section 51 similarly to general chats. The posting by the first user U and the various notifications from the registration section 51 to the first user U, that are illustrated in FIG. 2, may also be performed using the chat function provided by the first SNS.

This embodiment discloses various categories including a method, a system, and a program, in addition to a print control server.

For example, the print control system 80 includes the registration server 50 configured to register, in association with each other, the first account that is an account of the user of the first SNS and print setting information including designation information of the printer 60 to be used for printing, the first SNS print server 41 configured to, in accordance with a post of a print instruction from the first account on the first SNS, cause the printer 60 designated by the print setting information associated with the first account in the registration server 50 to execute printing, and the second SNS print server 42 configured to, in accordance with a post of a print instruction from the second account that is an account of the user of the second SNS on the second SNS, cause the printer 60 designated by print setting information associated with the second account to execute printing. The registration server 50 accepts a designation of the first account and a designation of the second account that is to be a share destination of a print setting, and registers the print setting information associated with the first account also in association with the second account.

A print control method for controlling printing through an SNS includes registering, in association with each other, the first account that is an account of the user of the first SNS and print setting information including designation information of the printer 60 to be used for printing (refer to FIG. 2). The registering accepts a designation of the first account and a designation of the second account that is an account of the user of the second SNS and that is to be the share destination of the print setting, and registers the print setting information associated with the first account also in association with the second account.

Obviously, the first SNS may share the print setting information with a plurality of SNSs. Specifically, when the user U has accounts of the first SNS, the second SNS, a third SNS, a fourth SNS, and so on, as with the case in which the print setting information is shared between the first SNS account and the second SNS account, the print setting information may be shared between the first SNS account and the third SNS account, the first SNS account and the fourth SNS account, and the like.

What is claimed is:

1. A print control server that controls printing through a social networking service (SNS), the print control server comprising:
   a registration section configured to register, in association with each other, a first account that is an account of a user of a first SNS and print setting information including designation information of a printer to be used for printing, wherein
   the registration section accepts a designation of the first account and a designation of a second account that is an account of a user of a second SNS and that is to be a share destination of a print setting, and registers the print setting information associated with the first account also in association with the second account.

2. The print control server according to claim 1, wherein the registration section
   issues a first password when accepting the designation of the first account and the designation of the second account,
   notifies the first account of the first password through the first SNS, and
   registers, when a password posted on the second SNS by the second account coincides with the first password, the print setting information associated with the first account also in association with the second account.

3. The print control server according to claim 2, wherein after determining whether the password posted on the second SNS by the second account coincides with the first password, the registration section invalidates the first password.

4. The print control server according to claim 2, wherein the registration section sets an expiration period of the first password, and, when the password is posted on the second SNS by the second account, in a case in which the expiration period of the first password elapsed, the registration section determines that the password posted on the second SNS by the second account does not coincide with the first password.

5. The print control server according to claim 2, wherein the registration section obtains a password posted by the second account by means of a chat function provided by the second SNS.

6. A print control system, comprising:
   a registration server configured to register, in association with each other, a first account that is an account of a user of a first social networking service (SNS) and print setting information including designation information of a printer to be used for printing;
   a first SNS print server configured to cause, in accordance with a post of a print instruction from the first account on the first SNS, the printer designated by the print setting information associated with the first account in the registration server to execute printing; and a second SNS print server configured to cause, in accordance with a post of a print instruction from a second account that is an account of a user of a second SNS on the second SNS, the printer designated by print setting information associated with the second account to execute printing, wherein the registration server accepts a designation of the first account and a designation of the second account that is to be a share destination of a print setting, and registers the print setting information associated with the first account also in association with the second account.

7. A print control method for controlling printing through a social networking service (SNS), the print control method comprising:
   a registering step of registering, in association with each other, a first account that is an account of a user of a first SNS and print setting information including designation information of a printer to be used for printing, wherein
   the registering step accepts a designation of the first account and a designation of a second account that is an account of a user of a second SNS and that is to be a share destination of a print setting, and registers the print setting information associated with the first account also in association with the second account.

* * * * *